(12) United States Patent
Hattori et al.

(10) Patent No.: US 7,273,563 B2
(45) Date of Patent: Sep. 25, 2007

(54) METHOD FOR MANUFACTURING A MAGNETIC RECORDING MEDIUM

(75) Inventors: Kazuhiro Hattori, Chuo-ku (JP); Shuichi Okawa, Chuo-ku (JP); Takahiro Suwa, Chuo-ku (JP); Mikiharu Hibi, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/048,728

(22) Filed: Feb. 3, 2005

(65) Prior Publication Data

US 2005/0175791 A1   Aug. 11, 2005

(30) Foreign Application Priority Data

Feb. 10, 2004   (JP)   ............... 2004-032856

(51) Int. Cl.
*H01F 1/00*   (2006.01)
(52) U.S. Cl. .............. 216/22; 216/38; 216/39; 216/66; 216/72
(58) Field of Classification Search ............. None
See application file for complete search history.

(56) References Cited

U.S. PATENT DOCUMENTS

| | | | | |
|---|---|---|---|---|
| 4,614,563 A | * | 9/1986 | Kubo | ............... 216/17 |
| 4,676,868 A | * | 6/1987 | Riley et al. | ............... 438/697 |
| 6,014,296 A | | 1/2000 | Ichihara et al. | |
| 6,305,072 B1 | * | 10/2001 | Yoda et al. | ............... 29/603.14 |
| 2005/0086795 A1 | * | 4/2005 | Suwa et al. | ............... 29/603.01 |

FOREIGN PATENT DOCUMENTS

| | | |
|---|---|---|
| JP | A 57-050436 | 3/1982 |
| JP | A 61-227183 | 10/1986 |
| JP | A 06-162448 | 6/1994 |
| JP | A 9-97418 | 4/1997 |

\* cited by examiner

*Primary Examiner*—Allan Olsen
(74) *Attorney, Agent, or Firm*—Oliff & Berridge, PLC

(57) ABSTRACT

A method for manufacturing a magnetic recording medium is provided, which can efficiently manufacture a magnetic recording medium that includes a recording layer formed in a concavo-convex pattern and has good recording and reproduction characteristics. The method includes: a non-magnetic material filling step of depositing a non-magnetic material over a recording layer formed in a predetermined concavo-convex pattern over a substrate so as to fill a concave portion of the concavo-convex pattern with the non-magnetic material; and a flattening step of removing the excess part of the non-magnetic material above the recording layer by dry etching so as to flatten the surfaces of the non-magnetic material and the recording layer. The flattening step includes a former flattening step and a latter flattening step for finishing.

12 Claims, 5 Drawing Sheets

METHOD FOR MANUFACTURING A MAGNETIC RECORDING MEDIUM

BACKGROUND OF THE INVENTION

1. Field of the Invention

The present invention relates to a method for manufacturing a magnetic recording medium including a recording layer formed in a concavo-convex pattern.

2. Description of the Related Art

Conventionally, in a magnetic recording medium such as a hard disc, areal density has been largely improved by various types of development such as miniaturization of magnetic particles forming a recording layer, change of the material for the recording layer, and miniaturization of head processing. The further improvement of the areal density continues to be expected.

However, many problems including the limitation of the head processing, erroneous writing of data on adjacent tracks caused by spreading magnetic fields of the recording head, crosstalk, and the like are made apparent. Thus, the improvement of the areal density by the conventional development approach has reached the limit. Therefore, as candidates of a magnetic recording medium that enables further improvement of the areal density, a magnetic recording medium such as a discrete track medium or a patterned medium, in which a recording layer is formed in a predetermined concavo-convex pattern, has been proposed (see Japanese Patent Laid-Open Publication No. Hei 9-97419, for example).

On the other hand, when the surface of the medium is formed in a concavo-convex pattern, the flying height of a head slider may be unstable, thus degrading the recording and reproduction characteristics. Therefore, it is necessary to flatten the surface of the medium by depositing a non-magnetic material over the recording layer of the concavo-convex pattern to fill concave portions and then removing the excess part of the non-magnetic material above the recording layer.

As a technique for processing a recording layer in a concavo-convex pattern, dry etching can be used. As a technique for depositing a non-magnetic material, a deposition technique used in the art of semiconductor manufacturing, such as sputtering, can be used. In addition, as a technique for removing the excess part of the non-magnetic material above the recording layer to flatten the surface, a process technique used in the art of semiconductor manufacturing, such as CMP (Chemical Mechanical Polishing), can be used.

However, CMP has the following problems. In order to remove slurry, cleaning and the like require large amount of time and cost. Moreover, because CMP is a wet process, when CMP is combined with a dry process such as a process for processing the recording layer, transfer of an object to be processed, and the like are complicated. This lowers efficiency of the whole manufacturing process. In other words, when CMP is used in the flattening process, the production efficiency is low.

In addition, in a case of performing CMP, it is not easy to control the processed amount and it is difficult to restrict end points (process end points) within a range of several nanometers. Therefore, the non-magnetic material may remain above the recording layer, or a part of the recording layer may be processed. This degrades the recording and reproduction characteristics.

SUMMARY OF THE INVENTION

In view of the foregoing problems, various exemplary embodiments of this invention provide a method for manufacturing a magnetic recording medium, which can efficiently manufacture a magnetic recording medium that includes a recording layer formed in a concavo-convex pattern, provides stable flying property of a head slider, and has good recording and reproduction characteristics.

In a process to reach the present invention, the inventors of the present invention tried to remove the excess part of the non-magnetic material above the recording layer by dry etching, such as ion-beam etching, so as to flatten the surface. This is because the inventors of the present invention considered as follows. Dry etching such as ion-beam etching has a high flattening effect, because it tends to selectively remove a projecting portion of a film to be processed faster than other portions of the film. Moreover, when dry etching is used instead of a wet process such as CMP, the need of cleaning of slurry or the like can be eliminated. Also, the efficiency of the whole manufacturing process can be improved, when another dry etching process is combined. Furthermore, dry etching can restrict the end points (process end points) within a range of several nanometers relatively easily. Therefore, the use of dry etching enables efficient manufacturing of a magnetic recording medium having a sufficiently flat surface.

However, although the use of dry etching such as ion beam etching could sufficiently flatten the surface to a desired level, the condition of dry etching had to be set so as to achieve a low etching rate in order to flatten the surface to a desired level and restrict the end points (process end points) within a range of several nanometers. For this reason, the production efficiency could not be improved sufficiently. Adjusting the etching condition could increase the etching rate, but it was difficult to sufficiently flatten the surface of the medium to a desired level and to restrict the end points (process end points) within a range of several nanometers. In other words, it was difficult to achieve the sufficient flattening, precise control of the processed amount, and improvement of the production efficiency simultaneously.

Thus, the inventors of the present invention made further consideration earnestly, and reached the present invention. In the various exemplary embodiments of this invention, the flattening step is constituted by a former flattening step and a latter flattening step. The former flattening step is performed under an etching condition providing good production efficiency, and thereafter the latter flattening step is performed to sufficiently flatten the surface while controlling the end points (process end points) precisely.

The flattening step tends to take longer time than other steps. However, by dividing the flattening step into the former flattening step and the latter flattening step and making time required for each of them close to time required for at least one of a pre-step and a post-step of the flattening step, it is possible to prevent the flattening step from becoming a rate determining step of the whole manufacturing process. Thus, the production efficiency can be also improved.

Accordingly, various exemplary embodiments of the invention provide a method for manufacturing a magnetic recording medium, comprising:

a non-magnetic material filling step of depositing a non-magnetic material over a recording layer formed in a predetermined concavo-convex pattern over a substrate to fill a concave portion of the concavo-convex pattern with the non-magnetic material; and a flattening step of removing an excess part of the non-magnetic material above the recording layer by dry etching to flatten a surface of the recording layer and a surface of the non-magnetic material, wherein the flattening step includes a former flattening step and a latter flattening step for finishing.

In the present application, the term "recording layer formed in a concavo-convex pattern" is used to mean not only a recording layer divided into a number of recording elements but also a recording layer that is partially divided to leave a part of the recording layer continuous, a recording layer continuously formed over a part of a substrate, such as a spiral recording layer, and a continuous recording layer in which both a convex portion and a concave portion are formed.

In the present application, the term "etching rate" is used to mean the amount processed by etching per unit time.

In the present application, the term "magnetic recording medium" is not limited to a hard disc, a floppy (registered trademark) disc, a magnetic tape, and the like, which use only magnetism for recording and reproducing information. This term is used to mean not only the above-listed media but also a magneto optical recording medium such as an MO (Magneto Optical), which uses magnetism and light, and a heat-assisted recording medium which uses magnetism and heat.

According to various exemplary embodiments of the present invention, the former flattening step is performed under the etching condition providing the good production efficiency, and thereafter the surface is finished in the latter flattening step so as to be sufficiently flat. Thus, it is possible to flatten the surface efficiently and sufficiently, while controlling the end points (process end points) precisely. Moreover, by making the time required for each of the former flattening step and the latter flattening step close to the time required for at least one of the pre-step and the post-step of the flattening step, the production efficiency can be improved.

BRIEF DESCRIPTION OF THE DRAWINGS

Various exemplary embodiments of the present invention will be described in detail with reference to the accompanying drawings, wherein.

DETAILED DESCRIPTION OF THE PREFERRED EMBODIMENT

Various exemplary embodiments of this invention will be hereinafter described in detail with reference to the drawings.

Figure 1:
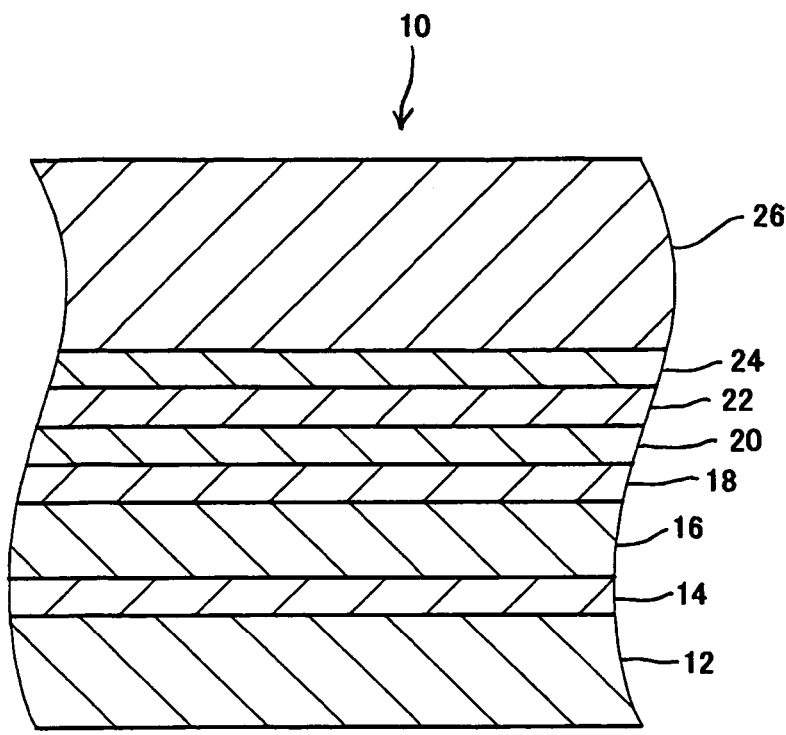
FIG. 1 is a side cross-sectional view schematically showing a starting body of an object to be processed according to a first exemplary embodiment of the present invention.
Figure 2:
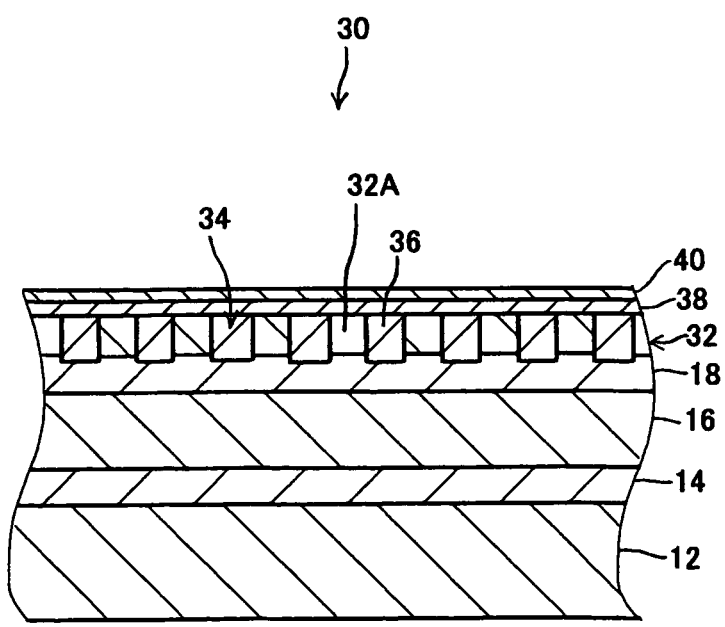
FIG. 2 is a side cross-sectional view schematically showing a structure of a magnetic recording medium obtained by processing the object to be processed.

A first exemplary embodiment of the present invention relates to a method for manufacturing a magnetic recording medium shown in FIG. 2 by processing a starting body of an object to be processed in which a continuous recording layer and the like are formed, as shown in FIG. 1, so as to divide the continuous recording layer into a number of recording elements in a predetermined concavo-convex pattern and fill concave portions between the recording elements (i.e., concave portions in the concavo-convex pattern) with non-magnetic material. This method has features in a non-magnetic material filling step and a flattening step. The other steps do not seem so important to understand this exemplary embodiment. Therefore, the description of them is omitted in an appropriate manner.

As shown in FIG. 1, the starting body of the object to be processed 10 includes a glass substrate 12, and an underlayer 14, a soft magnetic layer 16, a seed layer 18, a continuous recording layer 20, a first mask layer 22, a second mask layer 24, and a resist layer 26 formed over the glass substrate 12 in that order.

The underlayer 14 is 30 to 200 nm in thickness and made of Ta (tantalum), Cr (chromium) or a Cr alloy. The soft magnetic layer 16 is 50 to 300 nm in thickness and made of an Fe (iron) alloy or a Co (cobalt) alloy. The seed layer 18 is 3 to 30 nm in thickness and made of Cr, a CoCr alloy that is non magnetic, Ti (titanium), MgO (magnesium oxide), or the like. The continuous recording layer 20 is 5 to 30 nm in thickness and is made of a CoCr (cobalt-chromium) alloy. The first mask layer 22 is 3 to 50 nm in thickness and made of TiN (titanium nitride).

The second mask layer 24 is 3 to 30 nm in thickness and is made of Ni (nickel). The resist layer 26 is 30 to 300 nm in thickness and made of a negative resist (NBE22A manufactured by Sumitomo Chemical Co., Ltd.).

As shown in FIG. 2, a magnetic recording medium 30 is a discrete truck type magnetic disc of a perpendicular recording system. In the magnetic recording medium 30, a recording layer 32 is formed in a concavo-convex pattern obtained by dividing the aforementioned continuous recording layer 20 into a number of recording elements 32A at fine intervals. More specifically, in a data area of the magnetic recording medium 30, the recording elements 32A are formed concentrically at fine intervals in a radial direction of tracks. In a servo region, the recording elements 32A are formed in a pattern of predetermined servo information and the like. Concave portions 34 between the recording elements 32A are filled with a non-magnetic material 36. Over the recording elements 32A and the non-magnetic material 36, a protection layer 38 and a lubricating layer 40 are formed in that order.

The non-magnetic material 36 is made of SiO₂ (silicon dioxide). The protection layer 38 is 1 to 5 nm in thickness and made of a hard carbon film called as diamond like carbon. In the present application, the term "diamond like carbon" (hereinafter, simply referred to as "DLC") is used to mean a material that is mainly composed of carbon, has an amorphous structure, and has Vickers hardness of about 200 to about 8000 kgf/mm². The lubricating layer 40 is 1 to 2 nm in thickness and made of PEPE (perfluoro polyether).

Figure 3:
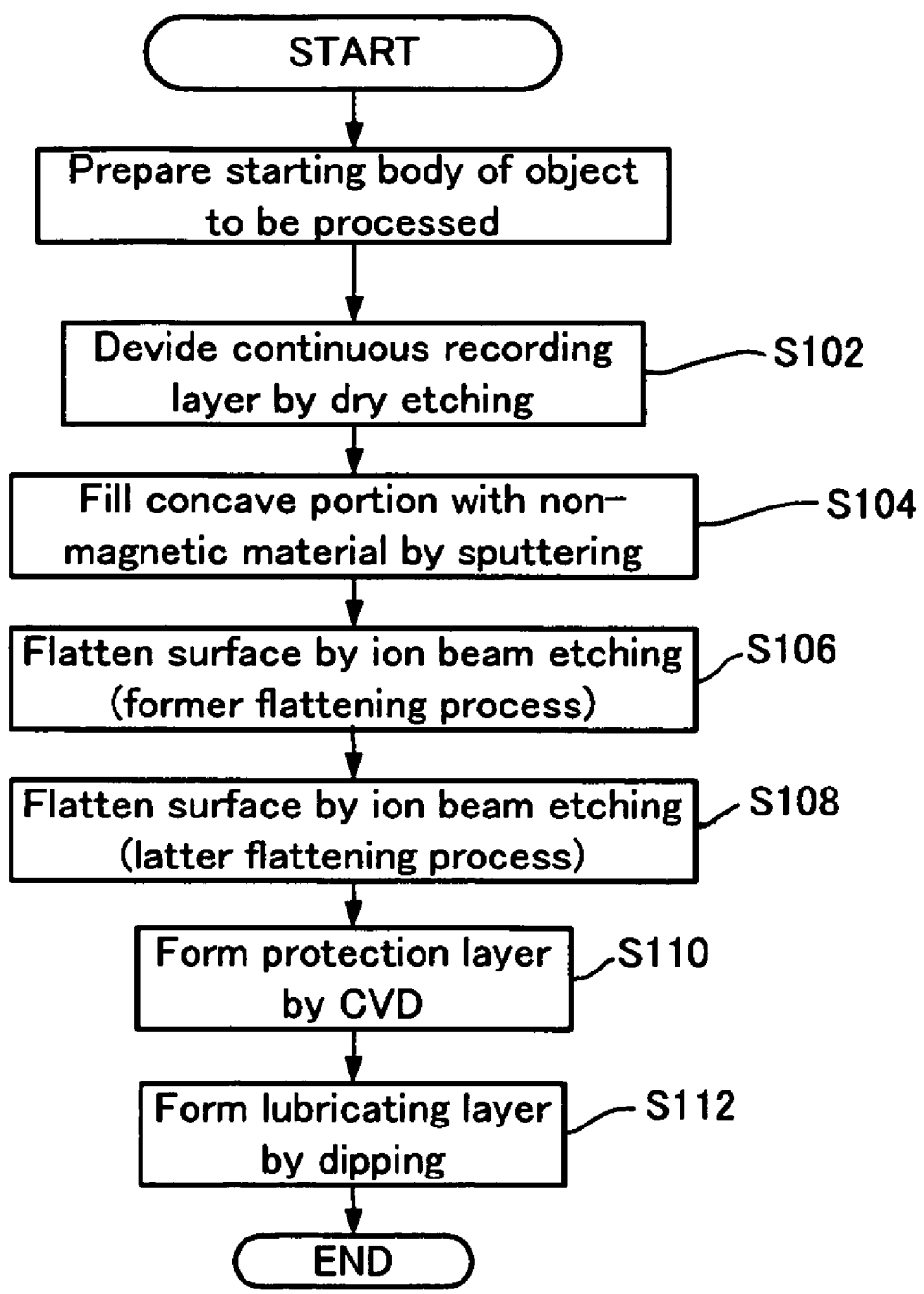
FIG. 3 is a flowchart showing the outline of a method for manufacturing the magnetic recording medium.

Next, a method for processing the object to be processed 10 will be described based on a flowchart of FIG. 3.

First, the starting body of the object to be processed 10 shown in FIG. 1 is processed, thereby dividing the continuous recording layer 20 into the recording elements 32A. Thus, the recording layer 32 is formed (S102).

More specifically, the starting body of the object to be processed 10 is obtained by forming the underlayer 14, the soft magnetic layer 16, the seed layer 18, the continuous recording layer 20, the first mask layer 22, and the second mask layer 24 over the glass substrate 12 in that order by sputtering, and then applying the resist layer 26 by dipping. Alternatively, the resist layer 26 may be applied by spin-coating.

Then, by nano-imprinting using a transfer device (not shown), a predetermined servo pattern including contact holes is transferred to the resist layer 26 of the aforementioned starting body of the object to be processed 10 in the servo area, and a concavo-convex pattern including concave portions and convex portions at fine intervals in the radial direction is transferred onto the resist layer 26 in the data area. Then, the resist layer 26 of the bottom portion of the concave portion of the concavo-convex pattern is removed by reactive ion etching using O₂ gas or the like as reactive gas. Alternatively, the resist layer 26 may be processed by performing exposure and development for the resist layer 26.

Figure 4:
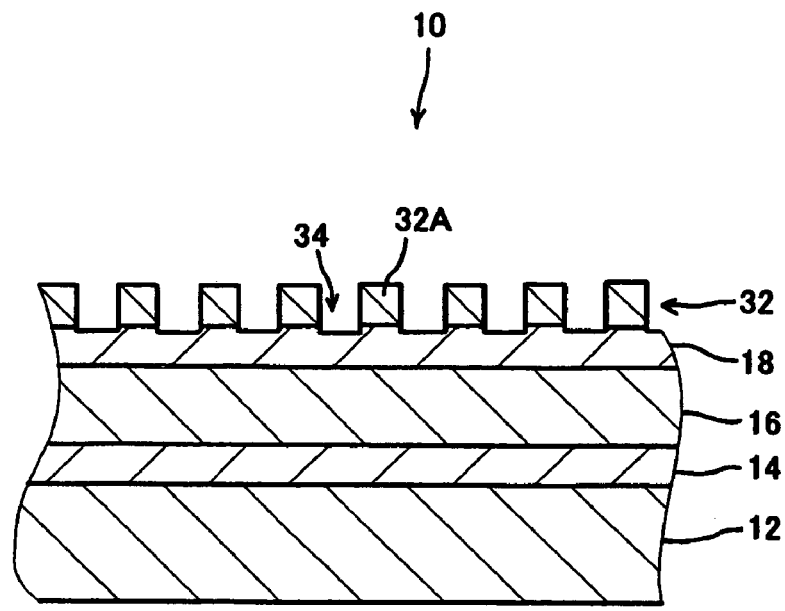
FIG. 4 is a side cross-sectional view schematically showing the shape of the object to be processed in which recording elements are formed on its surface.

Next, the second mask layer 24 of the bottom portion of the concave portion is removed by ion beam etching using Ar (argon) gas, and then the first mask layer 22 of the bottom portion of the concave portion is removed by reactive ion etching using SF₆ (sulfur hexafluoride) gas. As a result, the continuous recording layer 20 is exposed at the bottom portion of the concave portion. Then, the continuous recording layer 20 of the bottom portion of the concave portion is removed by reactive ion etching using CO gas and NH₃ gas as reactive gas. In this manner, the continuous recording layer 20 is divided into a number of recording elements 32A and the recording layer 32 is formed. Then, the first mask layer 22 remaining on the upper surface of the recording elements 32A is completely removed by reactive ion etching using SF₆ gas as reactive gas. As a result, the object to be processed 10 having the structure shown in FIG. 4, in which the recording layer 32 of the concavo-convex pattern has been formed on its surface, is obtained.

Figure 5:
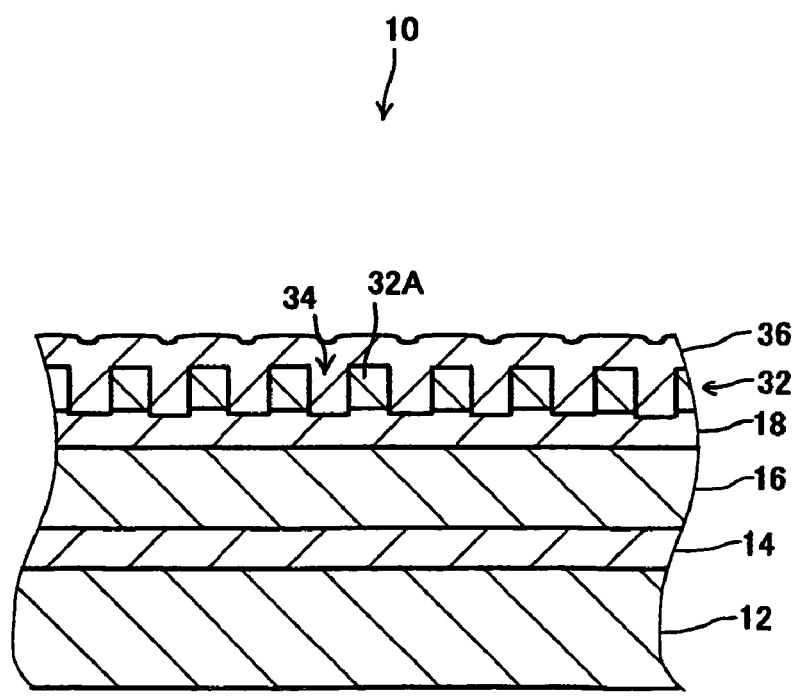
FIG. 5 is a side cross-sectional view schematically showing the shape of the object to be processed in which a non-magnetic material is deposited over the recording elements and concave portions are filled with the non-magnetic material.

Then, as shown in FIG. 5, particles of SiO₂ (non-magnetic material 36) are deposited on the surface of the object to be processed 10 by bias sputtering which applies a bias power to the object to be processed 10, thereby filling the concave portions 34 between the recording elements 32A with the non-magnetic material 36 (S104). The non-magnetic material 36 is deposited to completely coat the recording elements 32A.

In this deposition, the surface of the deposited non-magnetic material 36 tends to have a concavo-convex shape, because SiO₂ particles are scattered from SiO₂ target by collision of sputtering gas such as Ar with SiO₂ target and try to be deposited uniformly on the surface of the object to be processed 10 in a pattern following the concavo-convex shape of the recording elements.

On the other hand, by applying the bias power to the object to be processed 10, the sputtering gas is biased toward the object to be processed 10 and collides with the deposited layer of SiO₂, so that a part of the deposited SiO₂ layer is etched. This etching action tends to selectively remove a projecting portion of the deposited SiO₂ faster than other portions. Therefore, the concavo-convex pattern of the surface of the non-magnetic material 36 is gradually leveled off. In fact, those actions progress simultaneously. Because the depositing action occurs more than the etching action, the concavo-convex pattern of the surface is suppressed to be small and the deposition of the non-magnetic material 36 progresses.

Thus, the non-magnetic material 36 is deposited in a shape in which the concavo-convex pattern of the surface is suppressed, as shown in FIG. 5.

Then, in the flattening step using ion beam etching which is constituted by two steps, i.e., a former flattening step and a latter flattening step, the excess part of the non-magnetic material 36 is removed so as to flatten the surfaces of the recording elements 32A and the non-magnetic material 36. It should be noted that the term "excess part of the non-magnetic material" is used to mean a part of the non-magnetic material 36 that is located on the upper side (the opposite side to the glass substrate 12) of the upper surface of the recording layer 32 and remains above the recording elements 32A. The ion beam etching of the flattening step uses Ar gas. It should be noted that the term "ion beam etching" in the present application is used to collectively mean processing methods for irradiating an object to be processed with ionized gas to remove the processed object, such as ion milling.

Figure 6:
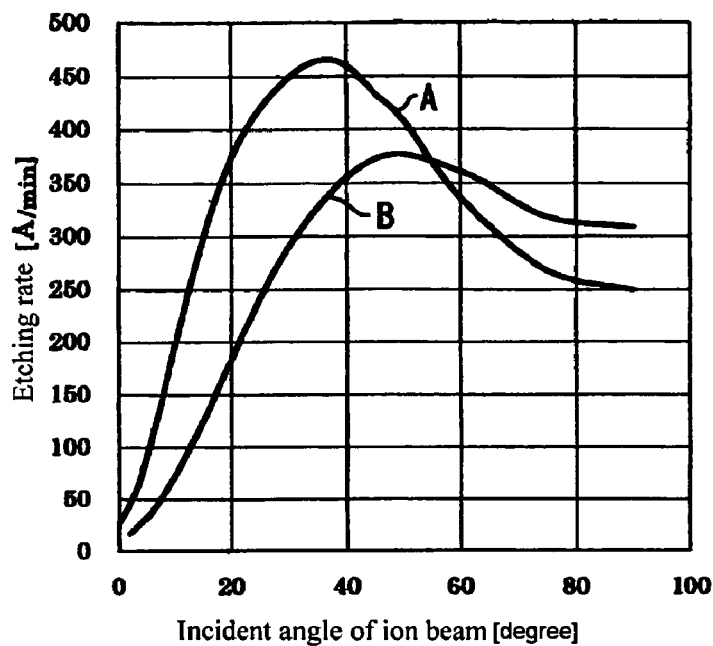
FIG. 6 is a graph showing a relationship between an incident angle and an etching rate in ion beam etching using Ar gas.

First, the former flattening step is performed (S106). In this former flattening step, an incident angle of ion beams is set to fall within a range of from 15° to 90°, preferably within a range of from 15° to 65°. The non-magnetic material 36 is removed in such a manner that small amount of the non-magnetic material 36 remains above the recording elements 32A. Please note that the term "incident angle" is an angle at which ion beams are incident on the surface of the object to be processed and is used to mean an angle formed by the surface of the object to be processed and the central axis of the ion beams. In the case where the central axis of the ion beams is parallel to the surface of the object to be processed, for example, the incident angle is 0°. In the case where the central axis of the ion beams is perpendicular to the surface of the object to be processed, for example, the incident angle is +90°. FIG. 6 shows the etching rate of SiO₂ (non-magnetic material 36) with respect to the incident angle of ion beams in ion beam etching using Ar gas as curve A and also shows that of CoCr alloy (recording layer 32) as curve B. From FIG. 6, a high etching rate can be achieved by setting the incident angle of Ar ions as described above.

Figure 7:
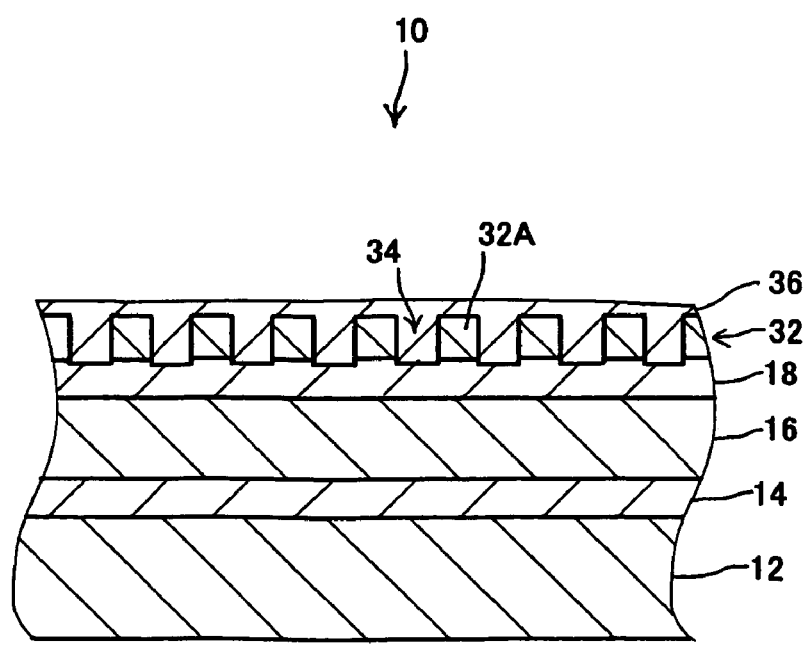
FIG. 7 is a side cross-sectional view schematically showing the shape of the object to be processed after a former flattening step.

In this manner, the non-magnetic material 36 is removed efficiently to a portion near the upper surface of the recording elements 32A, as shown in FIG. 7.

Then, the latter flattening step is performed (S108). In this latter flattening step, the incident angle of ion beams is set in such a manner that the incident angle falls within a range of from −10° to +15° and the etching rate of SiO₂ (non-magnetic material 36) is lower than that in the former flattening step (S106). Under those conditions, the non-magnetic material 36 is removed to the upper surface of the recording element 32A. By setting the incident angle of ion beams in the above-described manner, the etching rate can be suppressed to be low. Thus, controllability of the endpoints (process end points) of the flattening step can be improved. Moreover, an effect of leveling off the concavo-convex pattern can be enhanced, as compared with the former flattening step (S106).

Figure 8:
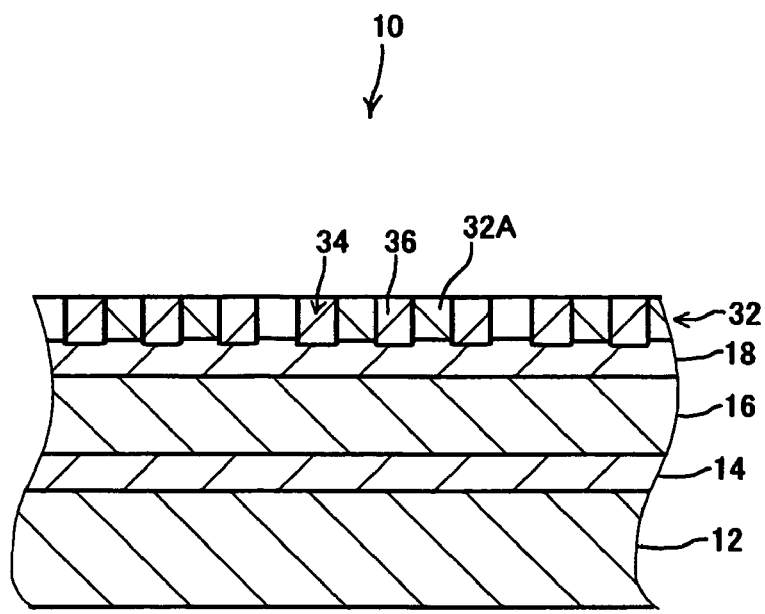
FIG. 8 is a side cross-sectional view schematically showing the shape of the object to be processed after a latter flattening step.

In this manner, as shown in FIG. 8, the non-magnetic material 36 is removed to the upper surface of the recording element 32A completely, and the upper surfaces of the non-magnetic material 36 and the recording elements 32A are sufficiently flattened. Please note that the non-magnetic material 36 is deposited to have a suppressed concavo-convex surface because of application of the bias power in the non-magnetic material filling step (S104). This makes flattening the non-magnetic material 36 easier. Moreover, the endpoints (process endpoints) are precisely controlled. Thus, even if the recording elements 32A are processed, the processed amount is small. Therefore, good recording and reproduction characteristics can be achieved.

Next, the protection layer 38 is formed on the upper surfaces of the recording elements 32A and the non-magnetic material 36 by CVD (Chemical Vapor Deposition) (S10). Then, the material for the lubricating layer 40 is applied on the protection layer 38 by dipping (S112). In this manner, the magnetic recording medium 30 shown in FIG. 2 is completed.

As described above, the non-magnetic material 36 is deposited while a bias power is applied to suppress the concavo-convex pattern of the surface, and then the non-magnetic material 36 is flattened in the two-step flattening step including the former flattening step (S106) and the latter flattening step (S108). Thus, it is possible to sufficiently flatten the surfaces of the recording elements 32A and the non-magnetic material 36 to a desired level. The surface of the lubricating layer 40 can be also flattened sufficiently to a desired level. Therefore, the stable flying property of a head slider can be obtained.

Moreover, the non-magnetic material 36 is removed to a portion near the upper surface of the recording element 32A in the former flattening step (S106) which is good in the production efficiency, and thereafter the small amount of the non-magnetic material 36 remaining above the recording element 32A is removed to the upper surface of the recording element 32A in the latter flattening step (S108) so as to finish the surface to be sufficiently flat. Thus, sufficient flattening, precise control of the end points (process end points), and the good production efficiency can be achieved simultaneously. In addition, by setting the processed amount in the former flattening step (S106) having a higher etching rate of the non-magnetic material 36 to be large and setting the processed amount in the latter flattening step (S108) having a lower etching rate of the non-magnetic material 36 to be small, the difference between the process times of those flattening steps can be reduced. Furthermore, by making the time required for each of the former flattening step (S106) and the latter flattening step (S108) close to the time required for at least one of the non-magnetic material filling step (S104) (i.e., pre-step of the flattening step) and the protection layer forming step (S110) (i.e., post-step of the flattening step), it is possible to prevent the flattening step from becoming a rate determining step of the whole manufacturing process, thus further improving the production efficiency.

In the first exemplary embodiment, the non-magnetic material 36 is deposited by sputtering. Alternatively, the non-magnetic material 36 may be deposited by other deposition methods, for example, ion beam deposition. In this case, the effect of suppressing concavo-convex pattern of the surface can also be achieved by applying a bias power. On the other hand, if the surface of the non-magnetic material 36 can be flattened sufficiently in the former flattening step (S106) and the latter flattening step (S108), the non-magnetic material 36 may be deposited without applying the bias power.

Moreover, in the first exemplary embodiment, ion beam etching in the former flattening step (S106) and the latter flattening step (S108) uses Ar gas. Alternatively, ion beam etching using another rare gas such as Kr (krypton) or Xe (xenon) may be employed.

In the first exemplary embodiment, the incident angle of ion beams is set to fall within a range of from −10° to +15° in the latter flattening step (S108). Alternatively, the incident angle of ion beams may be set to fall within a range of from 50° to 60°. In this case, as shown in FIG. 6, a value obtained by dividing the etching rate of $SiO_2$ (non-magnetic material 36) by the etching rate of CoCr alloy (recording layer 32) in the latter flattening step (S108) is closer to 1 than a value obtained by dividing the etching rate of $SiO_2$ by the etching rate of CoCr alloy in the former flattening step (S106). In other words, the etching rate of the non-magnetic material 36 is approximately equal to that of the recording layer 32 in the latter flattening step. Thus, even if the recording element 32A is processed together with the non-magnetic material 36, it is possible to prevent steps between the convex portions and the concave portions from increasing the height.

Next, a second exemplary embodiment of the present invention is described.

In the second exemplary embodiment, mixed gas of Ar gas and $C_2F_6$ gas (hexafluoroethane) is used in the former flattening step (S106) and the latter flattening step (S108), unlike the first exemplary embodiment. Alternatively, in the former flattening step (S106), only $C_2F_6$ gas may be used. The other steps are the same as those in the first exemplary embodiment and therefore the description thereof is omitted.

When the mixed gas of Ar gas and $C_2F_6$ gas is used as described above, $C_2F_6$ gas chemically reacts with $SiO_2$ so as to make $SiO_2$ brittle. In accordance with this, the etching rate can be increased. Thus, the surface can be flattened more efficiently.

It is preferable that the flow rate ratio of Ar gas in the mixed gas be adjusted to be in a range of from 0 to 70(%) in the former flattening step (S106) and be adjusted in a range of from 75 to 90(%) in the latter flattening step (S108).

Figure 9:
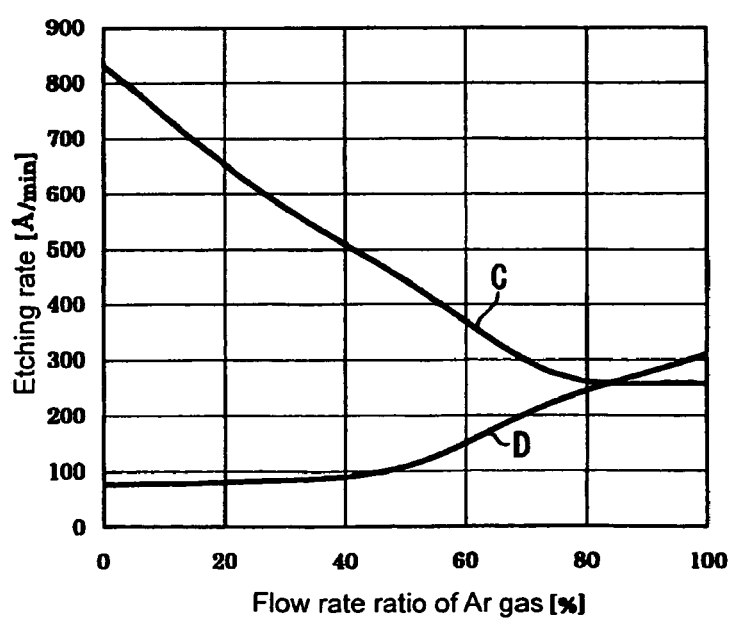
FIG. 9 is a graph showing a relationship between a flow rate ratio of Ar gas and an etching rate in ion beam etching using mixed gas of Ar gas and $C_2F_6$ gas.

FIG. 9 shows the etching rate of $SiO_2$ (non-magnetic material 36) as curve C and the etching rate of CoCr alloy (recording layer 32) as curve D with respect to a flow rate ratio of Ar gas in the mixed gas in ion beam etching in which the mixed gas of Ar gas and $C_2F_6$ gas is used and the incident angle is 90°.

By adjusting the flow rate ratio of Ar gas in the mixed gas to fall within a range of from 0 to 70(%) in the former flattening step (S106), a high etching rate of $SiO_2$ (non-magnetic material 36) can be obtained, as shown in FIG. 9. Such a high etching rate can improve the efficiency of flattening.

On the other hand, by adjusting the flow rate ratio of Ar gas in the mixed gas to fall within a range of from 75 to 90(%) in the latter flattening step (S108), the etching rate of $SiO_2$ (non-magnetic material 36) is made low, as shown in FIG. 9. Thus, the controllability of the end points (process end points) in the flattening step can be improved. Moreover, the effect of leveling off the concavo-convex can be enhanced, as compared with the former flattening step (S106). In addition, the etching rate of the non-magnetic material 36 and that of the recording layer 32 become approximately the same. Therefore, even if the recording elements 32A are processed together with the non-magnetic material 36, increase of the height of the steps between the concave portions and the convex portions can be prevented.

Please note that the adjustment of the etching rate in the latter flattening step and the improvement of the flatness of the surface can be achieved by changing the incident angle of ion beams as in the first exemplary embodiment.

Then, the protection layer 38 and the lubricating layer 40 are formed in the same manner as that in the first exemplary embodiment, so that the magnetic recording medium 30 is completed.

In the second exemplary embodiment, the mixed gas of Ar gas and $C_2F_6$ gas is used in the former flattening step (S106) and the latter flattening step (S108). Alternatively, mixed gas of another halogen or halide gas such as $SF_6$ (sulfur hexafluoride) or $CF_4$ (carbon tetrafluoride), and Ar gas may be used.

Moreover, in the first and second exemplary embodiments, both the former flattening step (S106) and the latter flattening step (S108) use ion beam etching. Alternatively, another type of dry etching such as reactive ion etching may be used. Alternatively, ion beam etching may be used together with another type of dry etching such as reactive ion etching. In this case, it is preferable to use dry etching providing a high etching rate of the non-magnetic material 36 in the former flattening step (S106) and to use dry etching that is high in the effect of flattening the surface in the latter flattening step (S108).

In addition, in the first and second exemplary embodiments, different etching conditions are set between the former flattening step (S106) and the latter flattening step (S108). However, even in the case where the etching conditions in both the flattening step are made the same, by suppressing a difference between the step times required for the respective flattening step and making the times required for those flattening step close to time required for at least one of the pre-step and post-step of the flattening step, it is possible to prevent the flattening step from becoming a rate determining step of the whole manufacturing process.

In the first and second exemplary embodiments, the flattening step is constituted by the former flattening step (S106) and the latter flattening step (S108). Alternatively, the flattening step may be formed by three or more steps depending on the material for the non-magnetic material 36, the type of dry etching, the times required for the pre-step and the post-step, and the like. For example, by employing a flattening step having a high etching rate of the non-magnetic material 36 as the first step, a flattening step having a high effect of leveling off the concavo-convex as the second steps, and a flattening step in which the etching rates of the non-magnetic material 36 and the recording layer 32 are approximately equal as the third step, it is possible to finish the surface to be further flat while keeping the good production efficiency.

Moreover, in the first and second exemplary embodiments, the first mask layer 22, the second mask layer 24, and the resist layer 26 are formed over the continuous recording layer 20, and the recording layer 20 is divided by three-step dry etching. However, the materials for the resist layer and the mask layer, the number of layers, the thickness, the type of dry etching, and the like are not limited specifically, as long as the continuous recording layer 20 can be divided with high precision.

In the first and second exemplary embodiments, the material for the recording layer 32 (continuous recording layer 20) is a CoCr alloy. However, the present invention can be applied to processing of a magnetic recording medium including recording elements formed of another material such as another type of alloy containing an iron group element (Co, Fe (iron), Ni) or a layered structure of those elements, for example.

In the first and second exemplary embodiments, the underlayer 14, the soft magnetic layer 16, and the seed layer 18 are formed under the continuous recording layer 20. However, the structure under the continuous recording layer 20 may be appropriately changed depending on the type of the magnetic recording medium. For example, one or two of the underlayer 14, the soft magnetic layer 16, and the seed layer 18 may be omitted. Moreover, each of the above layers may be formed by a plurality of layers. Alternatively, the continuous recording layer may be formed directly on the substrate.

In the first and second exemplary embodiments, the magnetic recording medium 30 is a discrete track type magnetic disc of a perpendicular recording type in which the recording elements 32A are arranged side by side at fine intervals in the track-radial direction in the data area. However, the present invention can be also applied to manufacturing of a magnetic disc including recording elements arranged side by side at fine intervals in the track-circumferential direction (sector direction), a magnetic disc including recording elements arranged side by side at fine intervals in the track-radial direction and the track-circumferential direction, a PERM(pre-embossed recording medium) type magnetic disc including a continuous recording layer in which a concavo-convex pattern is formed, and a magnetic disc in which a track is formed spirally. Moreover, the present invention can also be applied to manufacturing of a magneto-optical disc such as an MO, a heat-assisted type magnetic disc which uses magnetism and heat, and another magnetic recording medium which includes a recording layer of a concavo-convex pattern and has a shape other than the disc shape, such as a magnetic tape.

WORKING EXAMPLE 1

A magnetic recording medium 30 was manufactured in the manner described in the first exemplary embodiment. More specifically, the recording layer 32 was formed in the following concavo-convex pattern.

Pitch: 150 nm

Width of a convex portion: 95 nm

Width of a concave portion: 55 nm

Step between the convex portion and the concave portion: 20 nm

Then, in the non-magnetic material filling step (S104), the non-magnetic material 36 was deposited to have a thickness of approximately 40 nm under the following conditions, thereby filling the concave portions 34 with the non-magnetic material 36. Please note that the above-described thickness of the non-magnetic material 36 is a distance between the highest projecting portion of the surface of the deposited non-magnetic material 36 and the upper surface of the recording layer 32.

Input power: 500 W

Ar gas pressure: 0.3 Pa

Bias power: 250 W

Then, in the former flattening step (S106), the non-magnetic material 36 was removed to the portion away from the upper surface of the recording layer 32 by approximately 3 nm, under the following conditions. The etching rate of the non-magnetic material 36 (SiO$_2$) was approximately 450 Å/min and the time required for processing was approximately 49 seconds.

Ar gas flow rate ratio: 11 sccm
    Gas pressure: 0.05 Pa
    Beam voltage: 500V
    Beam current: 500 mA
    Suppressor voltage: 400 V
    Incident angle of ion beams: +30°

Then, the latter flattening step (S108) was performed under the same conditions as those in the former flattening step (S106), except for the incident angle of ion beams. The incident angle of ion beams was set to about +2°. By performing the latter flattening step (S108), the non-magnetic material 36 was removed to the upper surface of the recording layer 32. The etching rate of the non-magnetic material 36 (SiO$_2$) was approximately 42 Å/min and the time required for the process was approximately 43 seconds.

That is, the total time required for the former flattening step (S106) and the latter flattening step (S108) was approximately 1.5 minutes. After the latter flattening step (S108), the surfaces of the recording layer 32 and the non-magnetic material 36 were observed with AFM (atomic force microscope). The observation results are shown below. Please note that a mean step shown below is a mean step between the upper surface of the recording elements 32A and the upper surface of the non-magnetic material 36.

Arithmetic mean roughness Ra: 0.68 nm
    Maximum height Rmax: 5.55 nm
    Mean step: 1.0 nm

WORKING EXAMPLE 2

In Working Example 2, only C$_2$F$_6$ (hexafluoroethane) gas was used in the former flattening step (S106) and mixed gas of Ar gas and C$_2$F$_6$ gas was used in the latter flattening step (S108), unlike Working Example 1. The other steps were performed in the same manner as those in Working Example 1.

In the former flattening step (S106), the conditions were set as follows, and the non-magnetic material 36 was removed to the portion away from the upper surface of the recording layer 32 by approximately 5 nm.

C$_2$F$_6$ gas flow rate: 11 sccm
    Flow rate ratio of Ar gas in mixed gas: 0%
    Gas pressure: 0.05 Pa
    Beam voltage: 500V
    Beam current: 500 mA
    Suppressor voltage: 400V
    Incident angle of ion beams: +90°

The etching rate of the non-magnetic material 36 (SiO$_2$) in the former flattening step (S106) was approximately 830 Å/min and the time required for processing was approximately 25 seconds.

On the other hand, in the latter flattening step (S108), the conditions were set as follows.

Ar+C$_2$F$_6$ gas flow rate: 11 sccm
    Flow rate ratio of Ar gas in mixed gas: approximately 85%
    Gas pressure: 0.05 Pa
    Beam voltage: 500V
    Beam current: 500 mA
    Suppressor voltage: 400V
    Incident angle of ion beams: 90°

The etching rates of the recording layer 32 and the non-magnetic material 36 (SiO$_2$) in the latter flattening step (S108) were approximately 260 Å/min and the time required for processing was approximately 12 seconds.

That is, the total time required for the former flattening step (S106) and the latter flattening step (S108) was approximately 37 seconds. After the latter flattening step (S108), the surfaces of the recording layer 32 and the non-magnetic material 36 were observed with AFM. The observation results are shown below.

Arithmetic mean roughness Ra: 0.46 nm
    Maximum height Rmax: 4.19 nm
    Mean step: 0.0 nm As is apparent from the above, the time required for flattening was shortened in Working Example 2, as compared with Working Example 1. Moreover, the mean step between the upper surface of the recording element 32A and the upper surface of the non-magnetic material 36 was significantly reduced, as compared with Working Example 1. The reason for this is considered because the etching rates of the recording layer 32 and the non-magnetic material 36 (SiO$_2$) in the latter flattening step (S108) were set to be approximately the same.

COMPARATIVE EXAMPLE 1

Unlike Working Example 1, the former flattening step (S106) was omitted and the non-magnetic material 36 was removed to the upper surface of the recording layer 32 in the latter flattening step (S108). The conditions in the latter flattening step (S108) were set to be the same as those in Working Example 1. The time required for the latter flattening step (S108) was approximately 9 minutes and 30 seconds.

After the latter flattening step (S108), the surfaces of the recording layer 32 and the non-magnetic material 36 were observed with AFM. The observation results are shown below.

Arithmetic mean roughness Ra: 0.71 nm
    Maximum roughness Rmax: 5.87 nm
    Mean step: 1.2 nm

COMPARATIVE EXAMPLE 2

Unlike Working Example 1, the latter flattening step (S108) was omitted, and the non-magnetic material 36 was removed to the upper surface of the recording layer 32 in the former flattening step (S106). The conditions in the former flattening step (S106) were set to be the same as those in Working Example 1.

The time required for the former flattening step (S106) was approximately 53 seconds. Moreover, after the former flattening step (S106), the surfaces of the recording layer 32 and the non-magnetic material 36 were observed with AFM. The observation results are shown below.

Arithmetic mean roughness Ra: 1.02 nm
    Maximum height Rmax: 9.28 nm
    Mean step: 2.8 nm In Comparative Example 1, the surface was flattened to a level close to that in Working Example 1. However, the time required for flattening was approximately six times that in Working Example 1 and therefore the production efficiency was not high.

In Comparative Example 2, the time required for flattening was shortened, as compared with that in Working Example 1. However, the surface could not be flattened sufficiently to the similar level as that in Working Example 1.

On the other hand, in Working Examples 1 and 2, sufficient flattening, precise control of the processed amount, and improvement of the production efficiency could be achieved simultaneously.

The present invention can be used for manufacturing a magnetic recording medium in which a recording layer is formed in a concavo-convex pattern, such as a discrete track medium or a patterned medium.

What is claimed is:

1. A method for manufacturing a magnetic recording medium, comprising:
   a non-magnetic material filling step of depositing a non-magnetic material over a recording layer formed in a predetermined concavo-convex pattern over a substrate to fill a concave portion of the concavo-convex pattern with the non-magnetic material; and
   a flattening step of removing an excess part of the non-magnetic material above the recording layer so that the non-magnetic material remains in the concave portion by dry etching to flatten a surface of the recording layer and a surface of the non-magnetic material, wherein
   the flattening step includes a former flattening step and a latter flattening step for finishing; and
   a time required for the former flattening step and a time required for the latter flattening step are each made closer to a time required for at least one of a pre-step and a post-step of the flattening step than a total time required for the former flattening step and the latter flattening step.

2. The method for manufacturing a magnetic recording medium according to claim 1, wherein
   the pre-step of the flattening step is the non-magnetic material filling step.

3. The method for manufacturing a magnetic recording medium according to claim 1, wherein
   the post-step of the flattening step is a protection layer forming step of forming a protection layer over the non-magnetic material and the recording layer.

4. A method for manufacturing a magnetic recording medium, comprising:
   a non-magnetic material filling step of depositing a non-magnetic material over a recording layer formed in a predetermined concavo-convex pattern over a substrate to fill a concave portion of the concavo-convex pattern with the non-magnetic material; and
   a flattening step of removing an excess part of the non-magnetic material above the recording layer so that the non-magnetic material remains in the concave portion by dry etching to flatten a surface of the recording layer and a surface of the non-magnetic material, wherein
   the flattening step includes a former flattening step and a latter flattening step for finishing;
   a gas mixture including an inert gas and a halogen-containing gas is used as a processing gas for the dry etching in the flattening step;
   a component ratio of the halogen-containing gas included in the processing gas is less in the latter flattening step than in the former flattening step; and
   a value obtained by dividing the etching rate of the non-magnetic material by an etching rate of the recording layer in the latter flattening step is closer to 1 than a value obtained by dividing the etching rate of the non-magnetic material by the etching rate of the recording layer in the former flattening step.

5. The method for manufacturing a magnetic recording medium according to claim 4, wherein
   the recording layer is made of an alloy including cobalt and chromium;
   the non-magnetic material is essentially made of silicon oxide;
   the inert gas is an argon gas;
   a ratio of the flow of the argon gas in the processing gas is in a range of 0 to 70% in the former flattening step; and
   the ratio of the flow of the argon gas in the processing gas is in a range of 75 to 90% in the latter flattening step.

6. The method for manufacturing a magnetic recording medium according to claim 5, wherein
   the halogen-containing gas is an ethane hexafluoride gas.

7. A method for manufacturing a magnetic recording medium, comprising:
   a non-magnetic material filling step of depositing a non-magnetic material over a recording layer formed in a predetermined concavo-convex pattern over a substrate to fill a concave portion of the concavo-convex pattern with the non-magnetic material; and
   a flattening step of removing an excess part of the non-magnetic material above the recording layer so that the non-magnetic material remains in the concave portion by dry etching to flatten a surface of the recording layer and a surface of the non-magnetic material, wherein
   the flattening step includes a former flattening step and a latter flattening step for finishing;
   the recording layer is made of an alloy including cobalt and chromium;
   the non-magnetic material is essentially made of silicon oxide;
   ion beam etching, using argon gas as a processing gas, is used as the dry etching in the flattening step;
   an incident angle of an ion beam with respect to a surface of the substrate is in a range of 15 to 90 degrees in the former flattening step; and
   the incident angle of the ion beam with respect to the surface of the substrate is in a range of −10 to 15 degrees in the latter flattening step; and
   a value obtained by dividing the etching rate of the non-magnetic material by an etching rate of the recording layer in the latter flattening step is closer to 1 than a value obtained by dividing the etching rate of the non-magnetic material by the etching rate of the recording layer in the former flattening step.

8. The method for manufacturing a magnetic recording medium according to claim 7, wherein
   surface roughness obtained by the latter flattening step is smaller than surface roughness obtained by the former flattening step.

9. The method for manufacturing a magnetic recording medium according to claim 7, wherein
   an etching rate of the non-magnetic material is higher in the former flattening step than in the latter flattening step.

10. The method for manufacturing a magnetic recording medium according to claim 9, wherein
    surface roughness obtained by the latter flattening step is smaller than surface roughness obtained by the former flattening step.

11. The method for manufacturing a magnetic recording medium according to claim 9, wherein a processed amount of the non-magnetic material in the latter flattening step is less than a processed amount of the non-magnetic material in the former flattening step.

12. The method for manufacturing a magnetic recording medium according to claim 11, wherein surface roughness obtained by the latter flattening step is smaller than surface roughness obtained by the former flattening step.

* * * * *